United States Patent [19]

Korsmeier et al.

[11] Patent Number: 4,802,142

[45] Date of Patent: Jan. 31, 1989

[54] DEVICE FOR CONTROLLING THE FLOW RATE OF A FUEL GAS/AIR MIXTURE AND/OR THE RATIO BETWEEN FUEL GAS AND AIR IN A FUEL GAS/AIR MIXTURE

[75] Inventors: Wilhelm Korsmeier, Recklinghausen; Dieter Wolf, Dorsten; Friedrich Vissel, Recklinghausen, all of Fed. Rep. of Germany

[73] Assignee: Ruhrgas Aktiengesellschaft, Essen, Fed. Rep. of Germany

[21] Appl. No.: 32,775

[22] Filed: Mar. 31, 1987

[30] Foreign Application Priority Data

Apr. 9, 1986 [DE] Fed. Rep. of Germany ....... 3611909

[51] Int. Cl.$^4$ .................. G05D 7/00; G05D 11/00; G05D 11/02; B01F 15/02
[52] U.S. Cl. ................... 366/160; 366/101; 366/162; 366/177; 366/182
[58] Field of Search ............... 366/150, 176, 177, 182, 366/76, 162, 341, 336–340, 349, 189, 160, 192, 101, 108; 431/12, 1; 261/30, 52; 123/590

[56] References Cited

U.S. PATENT DOCUMENTS

| | | | |
|---|---|---|---|
| 3,930,485 | 1/1976 | Konomi | 366/338 X |
| 3,932,567 | 1/1976 | Skidmore | 261/30 |
| 4,199,267 | 4/1980 | Hendrikz | 366/176 X |
| 4,352,573 | 10/1982 | Pandolfe | 366/176 |
| 4,589,777 | 5/1986 | Soler | 366/160 |
| 4,614,438 | 9/1986 | Kobayashi | 366/177 X |

Primary Examiner—Timothy F. Simone
Attorney, Agent, or Firm—Becker & Becker, Inc.

[57] ABSTRACT

A device for controlling the flow rate of a fuel gas/air mixture, and/or the ratio between the fuel gas and air in such a mixture. The device includes a body having an air inlet, a fuel gas inlet, a fuel gas/air mixture outlet, a gas-control passage in the body, with the cross-sectional area of the gas-control passage being variable via a control device for controlling the flow of fuel gas through the device, and an adjustable air-control passage for adjusting the flow of air through the device. The air-control and gas-control passages are configured and disposed in the body in such a way that they cooperate to also form an area within the body where said controlled fuel gas and air flows are combined and mixed.

9 Claims, 1 Drawing Sheet

DEVICE FOR CONTROLLING THE FLOW RATE OF A FUEL GAS/AIR MIXTURE AND/OR THE RATIO BETWEEN FUEL GAS AND AIR IN A FUEL GAS/AIR MIXTURE

BACKGROUND OF THE INVENTION

The present invention relates to a device for controlling the flow rate of a fuel gas/air mixture, and/or the ratio between the fuel gas and the air in such a mixture. The device includes a housing or body that is provided with an air inlet, a fuel gas inlet, a fuel gas/air mixture outlet, a gas-control passage that is variable by control means for controlling the flow of gas through the device, and an adjustable air-control passage for adjusting the flow of air through the device.

Conventional devices for fuel gas/air mixture control, such as that disclosed in West German Offenlegungsschrift No. 31 20 637-Korsmeier et al dated Dec. 16, 1982; belonging to the assignee of the present invention, comprise hollow tubular control means which may be rotated and moved in the axial direction in a tubular body. The rotation of the control means changes the diameter of the orifice of the gas inlet in the body of such a device, with this orifice communicating with the space within the control means. An air inlet spaced relative to the gas inlet in the axial direction of the body is also arranged in the body of said device. If the control means is moved inside said body, the diameter of the gas orifice and the diameter of an air orifice connecting the air inlet with the annular space between the control means and the body are changed simultaneously. The space within the control means and the annualar space communicate near that end of the control means that faces the end of said body from which the mixture is discharged, with the gas and the air combining only where the spaces communicate and forming a gas/air mixture only at that point. The known device was created for the controlled mixing of the two fluids entering the device at a pressure above atmospheric pressure and being discharged from the device for being conveyed further as a mixture. If the device is used for obtaining and controlling a fuel gas/air mixture, for example for a naturally or self-aspirating gas engine that draws air and fuel gas through the device at a pressure below atmospheric pressure by sucking the fuel air/gas mixture from the fuel gas/air mixture outlet of the device, the negative pressure at the air orifice may be substantially equal to the negative pressure at the mixture outlet, but the negative pressure at the gas orifice may be different due to a certain pressure drop in the gasway between the gas orifice and the gas outlet of the space within the control means attributable to certain features of the design such a device, said pressure difference between the gas orifice and the air orifice affecting the formation of the mixture in the event of changes in the negative pressure. To blend the gas flowing from the gas orifice through the inner space of the control means, and the air flowing separately from the air orifice through the annular space between the control means and the body of the device, at the gas outlet of the control means where the gas and the air combine, a mixing device comprising baffle plates or the like is provided as the fuel gas/air mixture outlet of the known device. Mixing air and gas with said mixing device consumes energy, thereby causing a pressure drop which must be added to the pressure drop across the air and the gas orifices.

It is an object of the present invention to provide a device for controlling the flow rate of a fuel gas/air mixture, and/or the ratio between the fuel gas and the air in the mixture, wherein the negative pressure at the air passage and at the gas passage will be the same when the fuel gas/air mixture is sucked from the mixture outlet of the device and the diameter of the gas-control passage and the diameter of the air-control passage are changed, and which will not consume energy by mixing the two gaseous fluids in a separate mixing device.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

According to the teachings of the present invention, the air passage and the gas passage provided for the control of gas and air flow are arranged in the body of the device in the area where the controlled flows of the fuel gas and the air are combined and blended. Since the gas-control passage and the air-control passage so provided for the control of the fuel gas and the air flow are located practically at the same point inside the body of the device, the negative pressures at the two passages are necessarily and automatically the same when gas and air are drawn through the device, for instance by a naturally aspirating gas engine. This permits a continuous and accurate control of the mixing of the fuel gas and air, even if the negative pressures change as a consequence of a change in suction. The arrangement of the two passages for controlling the gas and the air flows at practically the same point in the device means that the control and mixing areas are one and the same, and also achieves a conversion of the pressure drops resulting across the two passages via control thereof into energy which may be exploited for intensely mixing the gas and the air that are to be blended, thereby eliminating the need for a separate mixing device which would create an additional pressure drop.

In a preferred embodiment of the present invention, the two passages for the control of the fuel gas and the air flows may be achieved by providing a tubular piece that protrudes from the fuel gas/air mixture outlet of the device into the body of the device, said tubular piece being surrounded by an annular inner body chamber that is connected with the air inlet of the device; the air-control passage is formed between the rim of the tubular piece and the rim of an inner tube that is disposed opposite the tubular piece and protrudes into the inner body chamber. The inner tube is connected with the fuel gas inlet of the device, and the fuel gas-control passage is formed by the space between the rim of the inner tube and the peripheral surface of a control means that is movable inside the inner tube in the axial direction.

Further specific features of the present invention will be described in detail subsequently.

DESCRIPTION OF PREFERRED EMBODIMENTS

Figure 1:
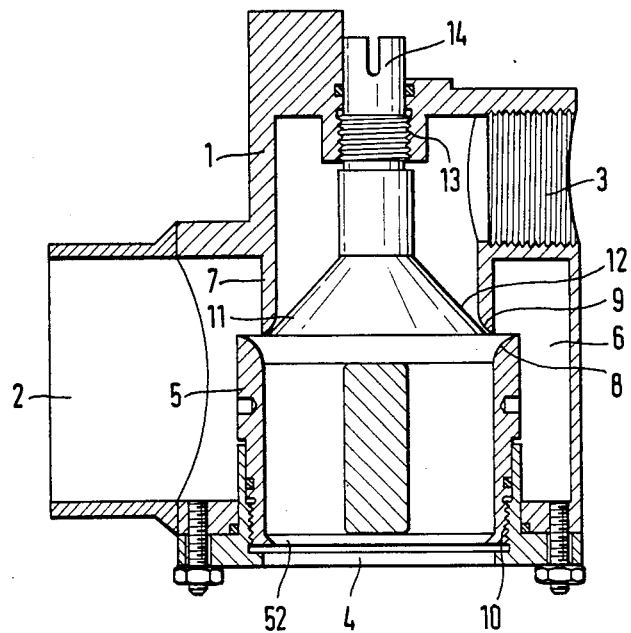
FIG. 1 is an axial cross-sectional view of one exemplary embodiment of the present invention.

Referring now to the drawing in detail, in the embodiment of the present invention illustrated in FIG. 1, the device comprises a housing or body 1 that is provided with an air inlet 2, a gas inlet 3, and a fuel gas/air mixture outlet 4. A pipe stub or tubular piece 5, which is surrounded by an annular inner space or chamber 6 of the body that is connected with the air inlet 2, protrudes from the fuel gas/air mixture outlet 4 into the body 1. An inner tube 7, which is connected with the gas inlet 3 and is part of the wall of the body 1, is disposed opposite the tubular piece 5 and protrudes into the inner chamber 6. The rim or edge 8 of the tubular piece 5, and the rim or edge 9 of the inner tube 7, form between them an air-control passage which may be adjusted by a rotation of the tubular piece 5 in the thread 10, with the tubular piece 5 being axially movable in the body 1. The inner tube 7 accommodates control means 11, with a gas-control passage being formed between the peripheral surface 12 of the control means 11 and the edge 9 of the inner tube 7. The control means 11 is rotatable in a thread 13 and is thereby movable in the axial direction.

By manually rotating the tubular piece 5, for example from the air inlet 2, and by manually rotating the control means 11 by turning the shaft 14 that protrudes from the body 1, the air-control passage and the gas-control passage may be adjusted to obtain, by the suction of air and gas, for example by a naturally aspirating gas engine, a flow of a defined fuel gas/air mixture required for a given engine speed, such as the maximum engine speed. This flow may be controlled further by a control valve arranged downstream of the fuel gas/air mixture outlet 4. The fuel gas/air mixing ratio may be readjusted, for example in the case of a change in the composition of the fuel gas, by rotation of the shaft 14 of the control means 11, for example by a motorized actuator (not depicted in FIG. 1).

Figure 2:
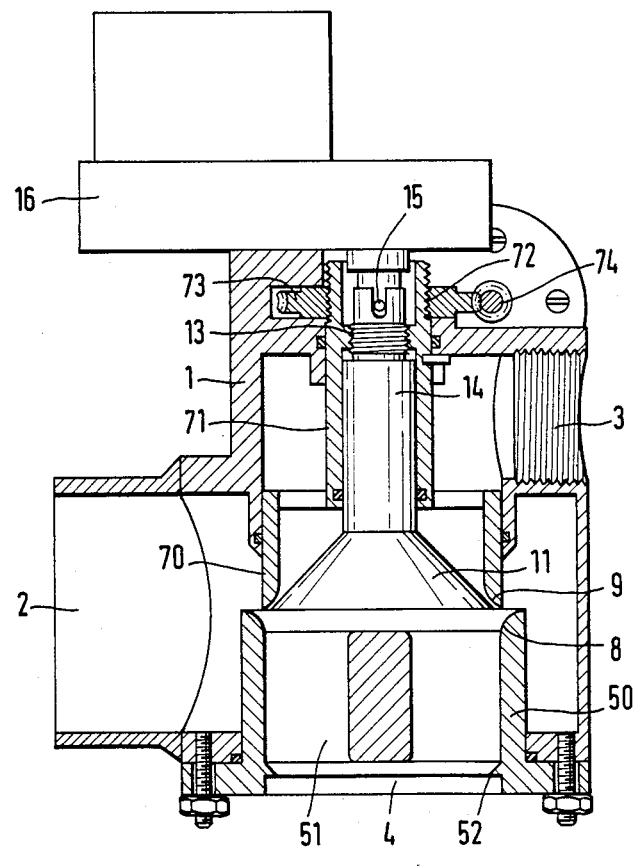
FIG. 2 is an axial cross-sectional view of another exemplary embodiment of the present invention.

Referring now to FIG. 2, which depicts another embodiment of the present invention, the tubular piece 50 is fixedly connected with the body 1. For the adjustment of the air-control passage between the inner tube 70 and the tubular piece 50, the inner tube 70 may be moved in the axial direction inside the body 1 together with the control means 11. For this purpose, the inner tube 70 is connected with a sleeve 71 which may be displaced in the axial direction in the body 1, with the inner tube 70 being secured in such a way as to prevent it from rotating. For an adjustment of the gas-control passage between the inner tube 70 and the control means 11, the shaft 14 of the control means 11 may be rotated by means of adjusting thread means 13 provided on the sleeve 71 for axial displacement of the control means 11 relative to the sleeve 71.

The inventive embodiment illustrated in FIG. 2 is advantageously used for controlling the flow rate of the fuel gas/air mixture directly by an adjustment of both the air-control passage and the gas-control passage in lieu of providing a control valve downsteam of the fuel gas/air mixture outlet 4. For controlling the flow rate in this manner, the sleeve 71 is provided with an adjusting thread means 72 that mates with a rotatable nut 73 fitted axially on the body 1. The nut 73 is adjusted by an actuator 74 for an adjustment of the air flow rate. The shaft 14 of the control means 11 is connected with an actuator 16 by a coupling device 15 of an axially variable length for the adjustment of the gas flow rate. Both actuators 16 and 74 are regulated or reset for controlling the flow rate of the fuel gas/air mixture, and one of the actuators 16 and 74 is regulated or reset for controlling the ratio between fuel gas and air in the mixture.

According to another aspect of the present invention, the edge 8 of the tubular piece 5 or 50 of the inventive embodiments illustrated in FIG. 1 or FIG. 2 may form an oblique or inclined funnel-like inlet; and the edge 9 of the inner tube 7 or 70, and the control means 11, may form a gas passage that widens conically in the direction of gas flow. The gas flow widens in the gas-control passage, thereby encountering the air flow that enters the air-control passage in a funnel-like manner in a transverse fashion, as a result of which the two controlled air and gas flows mix very well, even if the flow through the two passages is laminar. In a particularly preferred embodiment of the present invention, the edge 8 and the edge 9 are rounded so that the contours of said edges have shapes of the curves of square functions, and the shape of the control means 11 is that of a 45° cone. If the edges and the control means are shaped as described above, the pressures in the gas and air passages may be kept constant, thereby allowing, for example in the case of a change in pressure in the air system that varies the air flow through the air-control passage, an adjustment of flow through the gas-control passage proportionate with the change in air pressure to conform the gas flow to the changed air flow in order to keep the ratio at which gas and air are blended to obtain the fuel gas/air mixture constant. According to another aspect of the present invention, the peripheral surface 12 of the control means 11 has a maximum diameter that is less than the maximum outside diameter of the inner tube 7 at the point of the edge 9. Thus, the peripheral edge of the means 11 does not protrude into the air flow through the air-control passage when the control means is in the open position, which would cause an interference with air flow, hence disturbing the flow of gas through the gas-control passage. Since substantially gas-free boundary layer air flow may occur along the inner surface of the tubular piece 5 or 50, the latter is preferably provided with a projecting, circumferential flow deflector 52 around its inside circumference, at that end thereof adjacent to the fuel gas/air mixture outlet 4, in order to create swirls in the boundary layer air flow to mix the latter with the remaining mixture in the tubular piece. If a control valve is provided downstream of the fuel gas/air mixture outlet 4, the tubular piece 5 or 50 is preferably provided with guide plates 51 that serve as flow straighteners to prevent variations in flow and pressure upsteam of the control valve from having an effect on the air-control and gas-control passages and on air and gas mixing.

The present invention is, of course, in no way restricted to the specific disclosure of the specification and drawing, but also encompasses any modifications within the scope of the appended claims.

What we claim is:

1. In a device for controlling at least one of the flow rate of a fuel gas/air mixture, and the ratio between the fuel gas and air in such a mixture, with said device including a body having an air inlet, a fuel gas inlet, a fuel gas/air mixture outlet, a gas-control passage in said body, with the cross-sectional area of said gas-control passage being variable via a control means for controlling the flow of fuel gas through said device, and an adjustable air-control passage for adjusting the flow of air through said device, the improvement wherein:

said air control passage having a cross section and said gas-control passage having a cross section which are formed and disposed in said body in such a way that both cross sections with discharge sides thereof along a common edge of a body inner wall cooperate to also form an area at a location in common within said body where said controlled fuel gas and air flows are combined and mixed at once as controlled by both control cross sections where the discharge flow occurs.

2. In a device for controlling at least one of the flow rate of a fuel gas/air mixture, and the ratio between the fuel gas and air in such a mixture, with said device including a body having an air inlet, a fuel gas inlet, a fuel gas/air mixture outlet, a gas-control passage in said body, with the cross-sectional area of said gas-control passage being variable via a control means for controlling the flow of fuel gas through said device, and an adjustable air-control passage for adjusting the flow of air through said device, the improvement wherein:

said air-control and gas-control passages are formed and disposed in said body in such a way that they cooperate to also form an area with said body where said controlled fuel gas and air flows are combined and mixed;

a tubular piece that is connected to said body and communciates with said mixture outlet, said tubular piece extending from said outlet into the interior of said body, with said tubular piece being surrounded by an annular inner chamber of said body that communicates with said air inlet; said tubular piece also has a rim remote from said misture outlet;

an inner tube that is connected to said body, communicates with said fuel gas inlet, and extends into the interior of said body across from said tubular piece, with said inner tube having a rim remote from where said inner tube is connected to said body; and air-control passage is formed by a space provided between said rim of said tubular piece and said rim of said inner tube; and said control means being disposed in said body in such a way as to be movable in an axial direction of said control means, with the latter having a peripheral surface; said gas-control passage is formed by a space provided between said rim of said inner tube and said peripheral surface of said control means.

3. A device according to claim 2, in which said rim of said tubular piece is inclined to form a funnel-like inlet, and in which said rim of said inner tube forms with said control means a gas passage that widens conically in the direction of gas flow.

4. A device according to claim 3, in which said rim of said inner tube and said rim of said tubular piece are rounded in such a way that the contours of said rims have the shapes of the curves of square functions; and in which said control means has the shape of a 45° cone.

5. A device according to claim 4, in which the maximum diameter of said peripheral surface of said control means is less than the maximum outer diameter of said rim of said inner tube.

6. A device according to claim 2, in which said inner tube is integrally formed with said body, and said tubular piece is adjustably disposed in said body in such a way as to be movable in an axial direction of said tubular piece.

7. A device according to claim 2, in which said tubular piece is fixedly connected to said body, and said inner tube is axially movable in said body together with said control means.

8. A device according to claim 7, in which said inner tube is non-rotatably disposed in said body; in which an adjusting nut is rotatably mounted in said body to effect said axial movement of said inner tube; and in which adjusting thread means are provided for rotating and axially moving said control means within said inner tube.

9. A device according to claim 8, which includes respective actuator means for engaging said adjusting nut and said adjusting thread means.

* * * * *